United States Patent [19]
Norel et al.

[11] 3,883,841
[45] May 13, 1975

[54] METHOD AND DEVICE FOR THE PRECISE LOCALIZED DETERMINATION OF THE ACOUSTIC IMPEDANCE OF MATERIAL SITUATED IN PROXIMITY TO THE WALL OF A BOREHOLE

[75] Inventors: Guy Norel, Rueil-Malmaison; Robert Desbrandes, Clichy, both of France

[73] Assignee: Institut Francais du Petrole, des Carburants et Lubrifiants, France

[22] Filed: Feb. 22, 1973

[21] Appl. No.: 334,710

[30] Foreign Application Priority Data
Feb. 22, 1972    France .............................. 72.06010

[52] U.S. Cl......... 340/15.5 A; 181/0.5 BE; 310/8.3; 73/67.7; 340/15.5 BH; 340/17
[51] Int. Cl.............................................. G01v 1/40
[58] Field of Search ......... 340/18 R, 18 P, 15.5 BH, 340/15.5 A, 15.5 AC, 8 MM, 10, 17; 310/8.3, 9.1; 73/152, 67.8 S, 67.9; 181/0.5 BE, 0.5 ED

[56] References Cited
UNITED STATES PATENTS

| | | | |
|---|---|---|---|
| 2,875,354 | 2/1959 | Harris | 310/8.3 |
| 3,363,719 | 1/1968 | Venghiattis | 340/18 R |
| 3,542,150 | 11/1970 | Youmans | 340/15.5 AC |
| 3,585,580 | 6/1971 | Vogel | 340/18 P |
| 3,661,146 | 5/1972 | Peronneau | 73/67.8 |
| 3,712,414 | 1/1973 | Crawford | 181/0.5 ED |

*Primary Examiner*—T. H. Tubbesing
*Assistant Examiner*—H. A. Birmiel
*Attorney, Agent, or Firm*—Craig & Antonelli

[57] ABSTRACT

The local acoustic impedance of materials situated in proximity to a wellbore is determined by the processing of electrical signals transmitted into and reflected from locations in the materials adjacent the location of a sonde in the wellbore. The sonde is provided with transducer which contacts the lining of the wellbore via a sensor or feeler coupling element the acoustic impedance of which is known to aid in the acoustic impedance determination.

24 Claims, 16 Drawing Figures

METHOD AND DEVICE FOR THE PRECISE LOCALIZED DETERMINATION OF THE ACOUSTIC IMPEDANCE OF MATERIAL SITUATED IN PROXIMITY TO THE WALL OF A BOREHOLE

The present invention relates to a method and to a device for measuring the local acoustic impedance of materials situated in proximity to the wall of a borehole.

More precisely, the method and the device according to the present invention make it possible to determine, with the precision, the local acoustic impedance of the geological formations situated in the immediate vicinity of the wall of the borehole.

The product of the speed of propagation $V$ of an acoustic wave in a material by the volumetric mass $\rho$ of the material is designated as acoustic impedance $Z_a$ of a material $$Z_a = V \cdot \rho$$

Indicated in Table I below are the average values of the acoustic impedance $Z_a$, expressed in kg/m$^2$.sec., for some materials.

Table I

| Material | Impedance (kg/m².sec.) |
| --- | --- |
| Steel | $Z_a = 45 \cdot 10^6$ |
| Compact Dolomites | $Z_a = 20 \cdot 10^6$ |
| Compact Limestones | $Z_a = 17 \cdot 10^6$ |
| Compact Sandstones | $Z_a = 16 \cdot 10^6$ |
| Cement | $Z_a = 6 \cdot 10^6$ |
| Marls | $Z_a = 5 \cdot 10^6$ |
| Water | $Z_a = 1.5 \cdot 10^6$ |
| Gas | $Z_a = 330$ |

The value of the acoustic impedance of the geological formations characterizes the nature of these formations but, as is well known in the art, also permits a determination of other characteristics of the formations, such as their porosity.

In practice, the volumetric mass $\rho$ of the geological formations traversed by a borehole has been measured with the aid of a sonde emitting gamma radiation produced from a radioactive source, while the speed of propagation V is measured by means of an acoustic sonde.

Hence, it has been necessary to carry out two series of measurements so as to enable the calculation of the acoustic impedance of the formations situated in the vicinity of the wall of the borehole.

This process has been found to be very costly inasmuch as it has required two distinct apparatus which are operated separately, thereby increasing the measuring time. Moreover, the acoustic sondes used at present furnish only average indications which do not make it possible to obtain a very localized knowledge of the formations.

In fact, the acoustic sondes are generally composed of a transmitter situated at a first level in the borehole which emits acoustic impulses having a frequency between 15 kHz and 80kHz. The acoustic wave is propagated vertically in the formations and received by an acoustic receiver situated at a second level spaced apart from the transmitter by 30 to 90 cm. The speed of propagation thus measured is an average speed characterizing all of the formations between the transmitter and the receiver.

When the wall of the well is covered with a lining cemented in the well, the attenuation of the acoustic waves between the transmitter and the receiver, which depends upon the acoustic connection between the lining and the cement, gives a qualitative indication of the quality of the cementing of the lining. Experience has shown that this indication is not precise enough to allow a technician to thereby control the cementation of the lining.

Accordingly, it is the object of the present invention to provide a method and a device for the precise localized determination of the acoustic impedance of materials situated in the vicinity of the wall of a borehole, while obviating the drawbacks of previously employed devices.

The method proposed by the present invention for the precise localized determination of the acoustic impedance of material situated in proximity to the wall of a drilled well or shaft into which is introduced a measuring sonde connected by means of electrical conductors to a surface apparatus for processing the data furnished by the sonde is characterized in that the following steps or operations are successively carried out:

a. emitting an acoustic impulse in a direction substantially perpendicular to the wall of the well traversing the materials the acoustic impedance of which is to be determined, and through at least two intermediate elements having known acoustic characteristics said intermediate elements being in contact with said materials;

b. receiving at least one acoustic impulse being reflected substantially perpendicularly to the contact surface of said element and said materials;

c. generating in response to said at least one reflected impulse, an electric signal representative of said acoustic impulse;

d. transmitting said electric signal to said means for processing the data supplied by said sonde; and e. generating, in response to said electric signal, a resultant signal being representative of the acoustic impedance of said materials.

The device proposed by the present invention for the precise localized determination of the acoustic impedance of the materials situated in proximity to the wall of a drilled shaft or well into which is introduced a measuring sonde connected by means of electrical conductors to a surface apparatus for treating data is characterized in that the sonde comprises in combination the following elements:

a. first means for emitting an incident acoustic impulse in a direction substantially perpendicular to the axis of the well;

b. at least a second intermediate element having specific acoustic characteristics, placed in contact with said first element, the contact surface of said first intermediate element with said second element and with the wall of the well respectively being placed on the path of said incident acoustic impulse;

c. second means for receiving at least one reflected acoustic impulse originating from at least one point of reflection of the incident acoustic impulse on said contact surface of said first element and of the wall of the well in said direction being substantially perpendicular to the axis of the well, said receiving means supplying an electric signal representative of said reflected impulse upon receiving the latter;

d. control means connected to said first means for periodically enabling the emission of an incident acoustic impulse by said first means; and e. transmitting means, connected to said receiving means, and characterized in that it comprises a surface apparatus for processing said electric signal supplied by said receiving means, said surface apparatus being connected to said transmitting means.

The use of the device as proposed by the present invention enables the measurement of the acoustic impedance of geological formations situated in the immediate vicinity of a borehole and, consequently, permits the determination of the characteristics of these formations, such as the porosity and the degree of fissures or cracking thereof.

In a particularly advantageous, yet non-limitative, case of its application, the device according to the present invention permits the characterization of the quality of the cementing of a lining placed inside a borehole traversing geological formations.

The present invention will be better understood and other advantages thereof will become apparent from the following description of some embodiments thereof taken in connection with the accompanying drawings, wherein.

Figure 1:
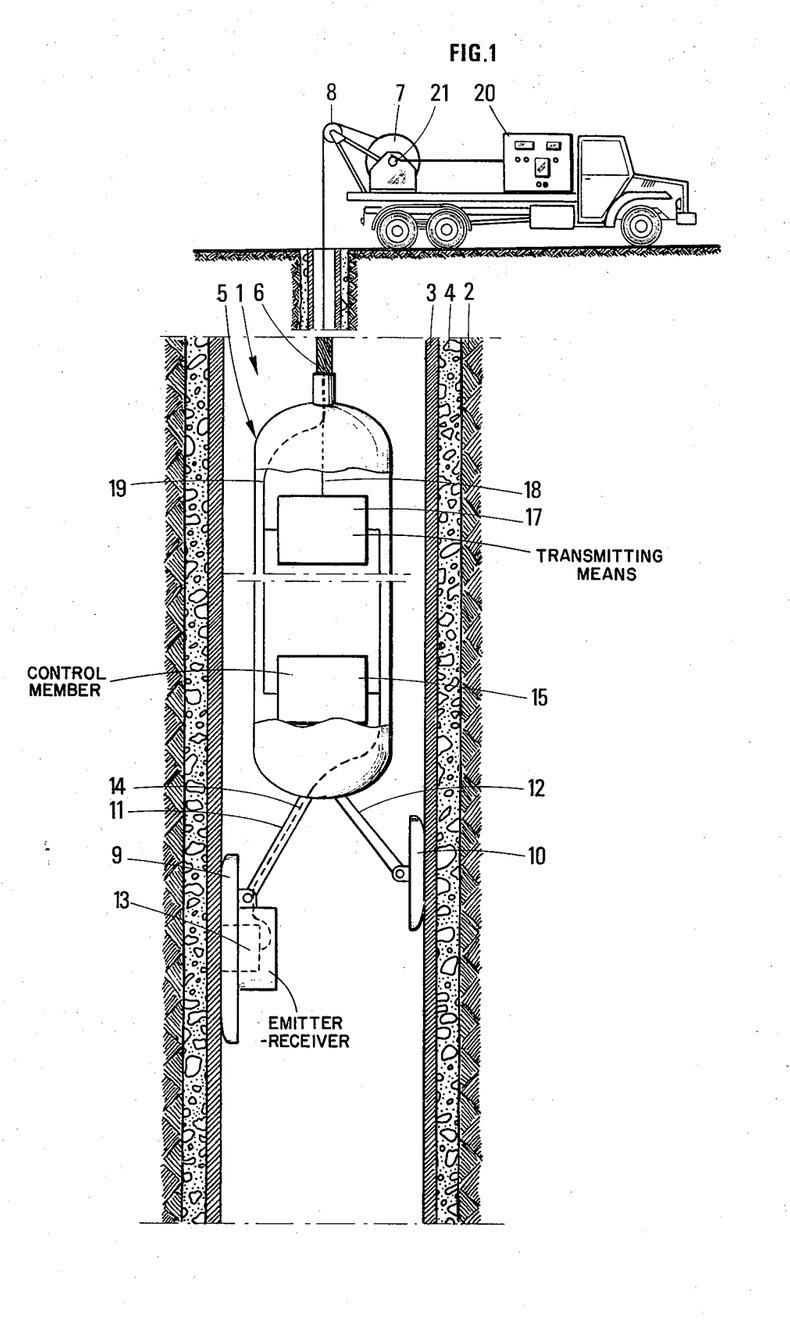
FIG. 1 schematically represents a first embodiment of the device according to the present invention, used for controlling the cementing of a lining placed inside a well traversing geological formations.

FIG. 1 schematically illustrates a first embodiment of the device according to the present invention, used for the control of the cementing of a lining placed inside a shaft or well.

In this figure, reference numeral 1 is used to identify a well traversing geological formations 2. A lining 3, for example of steel, is placed in the shaft or well 1. A cement layer 4 has been provided between the geological formations 2 and the lining 3.

The device comprises a sonde identified in the entirety thereof by reference numeral 5. This sonde 5 is suspended at the lower end of a carrier cable 6 which, at the surface installation, is wound on an operating winch 7 after having passed over a return pulley shown schematically at 8.

The sonde 5 is equipped with a measuring pad 9 and a centering pad 10, both of which are operable due to the action of hinged arms 11 and 12. The latter are controlled by any known means in order that, during the measuring periods, the pads 9 and 10 will be applied against the wall of the well which, in the case represented here, is the internal surface of the lining 3.

The measuring pad carriers, or supports, an ultrasonic emitter-receiver 13, which will be described in further detail with reference to FIG. 2. This emitter-receiver 13 is connected by means of conductors 14 to an electronic apparatus contained within the body of the sonde 5, this apparatus comprising, for example, a member 15 controlling sequentially the operation of the emitter-receiver 13 and of the means 17 for transmitting to the surface the electrical signals furnished by the emitter-receiver 13.

Electrical conductors 18 and 19, which may be incorporated in the carrier cable 6, assure the electrical connection between the sonde 5 and a surface apparatus 20 designed for the processing of the data delivered by the sonde. When the conductors such as 18 and 19 are incorporated in the carrier cable 6, turning or rotating contacts 21 fixed on or secured to the axle of the winch 7 assure the electrical connection of these conductors with the apparatus 20 during the displacement of the sonde within the well. The supply of the sonde with electric energy is assured by the cable 19, and the data being delivered by the sonde are transmitted to the surface apparatus 20 by means of the cable 18.

Figure 2:
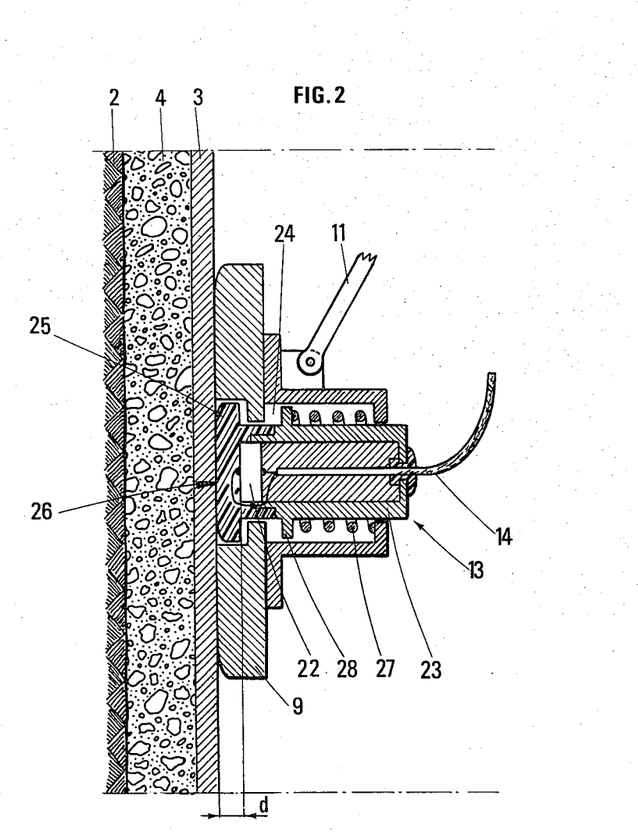
FIG. 2 represents the measuring pad provided in the sonde of FIG. 1 in an enlarged scale.

The measuring pad 9 is represented in a vertical cross-sectional view in FIG. 2.

The acoustic emitter-receiver 13 is composed of a transducer 22 of the piezo-electric type which, upon receiving an electric signal transmitted by the cable 14, emits an acoustic impulse and which, upon receiving an acoustic impulse, supplies an electric signal transmitted by the cable 14 to the electronic apparatus of the sonde.

The antenna pattern of the transducer 22 shows that the latter is very directive. The acoustic waves being emitted have a frequency which may be comprised between 0.1MHz and 5MHz.

The transducer 22 is placed in a box 23 contained within a housing 24 of the measuring pad 9. An intermediate sensor feeler element 25 being integral with the box 23 is interposed between the transducer 22 with which it is in contact and the internal surface of the well which in this case is the internal wall of the lining. The surface 26 of the sensor is such that it is applied directly against the internal wall of the well and takes the exact configuration of this wall. Elastic means 27 consisting for example of a spring and being interposed between the bottom of the housing 24 and a shoulder portion 28 of the box 23 maintain the feeler 25 in contact with the wall of the well while displacing the box perpendicularly to the axis of the sonde.

The device operates as follows:

The element 15 sequentially transmits at a predetermined frequency, and by means of the cable 14, an electric signal to the transducer 22. Transducer 22, in response to this signal, emits, perpendicularly to the axis of the well, an incident acoustic impulse which is propagated in the formations situated in the immediate vicinity of the wellbore. This ultrasonic impulse is reflected at the interfaces of the different layers. The reflected impulses are then received by the transducer 22 which provides an electric signal representative of the reflections of the emitted impulse.

This signal is transmitted by the conductor 14 to the means 17 for transmitting at the surface. The signal supplied by the sonde is transmitted by the cable 18 to the apparatus 20 situated at the surface for processing the data.

Figure 3:
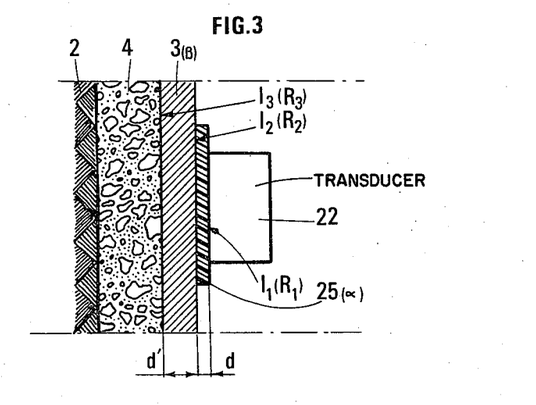
FIG. 3 illustrates schematically the operation of the sonde.

The determination of the parameters of the device according to the present invention is indicated and further described below with reference to FIG. 3, which schematically represents the principal elements of the inventive device.

Designated with reference symbol $I_1$ is the interface between the piezo-electric type transducer 22 and the feeler 25; $I_2$ is the interface between the feeler 25 and the lining 3; $I_3$ is the interface between the lining 3 and the cement 4, $R_1, R_2$ and $R_3$ are the respective acoustic reflection coefficients of these interfaces and $Z_{e-r}, Z_p, Z_l$ and $Z_c$ are the respective acoustic impedances of the transducer 22, the feeler 25, the lining 3 and the cement 4. Reference symbols or letters $d$ and $d'$ identify, respectively, the thicknesses, measured perpendicularly to the axis of the well, of the feeler 25 which has an acoustic attenuation coefficient $\alpha$ and of the lining 3 whose acoustic attenuation coefficient has been designated $\beta$.

An acoustic impulse emitted by the transducer 22 is reflected at the interfaces $I_1$, $I_2$, and $I_3$ by "echoes" which are intercepted or collected by the transducer 22. The respective amplitudes of these echoes will be considered throughout hereinafter, by way of example, but it would equally be possible to consider, instead, the surface areas of these different echoes rather than the amplitudes thereof without departing from the spirit and scope of the present invention.

It will be recalled as is known in the art that the acoustic reflection coefficient R on the contact surface of the two materials A and B having acoustic impedances $Z_A$ and $Z_B$, respectively, (or ratio of the amplitude of the acoustic signal reflected by this interface to the amplitude of the emitted signal) may be written as $|R|=|(m-1)/(m+1)|$, $m$ being the relative index between the two materials, defined as the ratio of the acoustic impedances $m = Z_A/Z_B$.

The values of the amplitudes of the echoes received by the transducers 22 are given hereunder, $A_M$ being the amplitude of the ultrasonic impulse emitted by the element 22:

a. reflection of the incident impulse at the interface $I_1$. A single reflection is produced at this interface and has the value $$A_{II} = A_m \cdot R_I$$

b. reflections of the incident impulse on the interface $I_2$.

After the successive reflections of the incident impulse on the interfaces $I_1$, and $I_2$, the transducers 22 will receive a succession of impulses $A_{21}, A_{22}, \ldots A_{2n}$ whose instants of arrival depend upon the thickness of the feeler and upon the speed of propagation of the acoustic wave in the feeler 25. The amplitudes of the "echoes" received have the following values:

$A_{21}=A_M \cdot (1-R_I)^2 \cdot R_2 \exp(-2\alpha d)$
$A_{22}=A_M \cdot (1-R_I)^2 \cdot R_I \cdot R_2^2 \cdot \exp(-4\alpha d)$
$A_{2n}=A_M \cdot (1-R_I)^2 \cdot R_I^{(n-1)} R_2^n \cdot \exp(-2n\alpha d)$ c. reflection of the incident impulse at the interface $I_3$. After the successive reflections of the incident impulse on the interfaces $I_2$ and $I_3$, the transducer 22 will receive a succession of impulses $A_{31}, A_{32}, \ldots A_{3n}$ whose instants of arrival depend upon the thickness of the lining and upon the speed of propagation of the acoustic wave in the material constituting the lining, and the amplitudes of the echoes received by the transducer 22 have the following values:

$A_{31}=A_M \cdot (1=R_I)^2 \cdot (1-R_2)^2 \cdot R_3 \cdot \exp(-2\alpha d - 2\beta d')$
$A_{32}=A_M \cdot (1-R_I)^2 \cdot (1-R_2)^2 \cdot R_2 \cdot R_3^2 \cdot \exp(-2\alpha d - 4\beta d')$
$A_{32}=A_M \cdot (1-R_I)^2 \cdot (1-R_2)^2 \cdot R_2 \cdot R_3^3 \cdot \exp(-2\alpha d - 4\beta d')$
$A_{3n}=A_M \cdot (1-R_I)^2 \cdot (1-R_2)^2 \cdot R_2^{(n-1)} \cdot R_3^n \cdot \exp(-2n\alpha d - 2n\beta d')$ In practice, the values measured for the amplitudes of the different echoes depend upon the materials of which the transducer 22 and feeler 25 consist and which are chosen as indicated below.

a. Choice of the Transducer 22

For the purpose of obtaining a very localized exploration, the transducer 22 will be chosen from among those which emit an acoustic signal with a frequency between 0.1 MHz and 5 MHz. For the usual applications in wells, a transducer will preferably be chosen which consists of a crystal emitting an acoustic signal with a frequency close to 1MHz, chosen from among the following, non-limitative materials: lead zirconate, barium titanate, quartz, zinc silicate, and rubidium or cesium phosphate.

b. Choice of the Material Making Up the Feeler 25

The material which will make up the feeler 25, or of which the feeler 25 consists, will be determined as a function of the piezo-electric element 22 and as a function of the characteristic of the lining 3.

In fact, in order to maximize the acoustic energy transmitted by the feeler, it is necessary that the acoustic impedance of the feeler $Z_p$ be as close as possible to that of the emitter $Z_{e-r}$.

Under these conditions, the coefficient $R_I$ will be as small as possible, and the echoes measured being produced on the interfaces $I_1$ and $I_2$ have minimal amplitudes $A_{11}, A_{22}, A_{23} \ldots A_{2n}$. In order to further reduce the echo amplitudes $A_{22}, A_{23}, \ldots A_{2n}$ being proportional to the coefficient $\exp(-4\alpha d)$, $\exp(-6\alpha d), \ldots \exp(-2n\alpha d)$, a material will be chosen for the feeler 25 which has a product $\alpha d$ large enough so that the attenuation of the amplitudes $A_{22}, A_{23} \ldots A_{2n}$ is more rapid than that of the amplitudes $A_{31}, A_{32} \ldots A_{3n}$. The general mathematical expression of the amplitude of an echo $A_{3n}$ shows that, in order to observe several echoes of the value of the reflection coefficient, $R_2$ must be between 0 and 1. A value close to 0.5 will preferably be adopted, which means that the feeler must have an acoustic impedance clearly smaller than the acoustic impedance of the lining.

Moreover, in order that the amplitude $A_{3n}$ of an echo will be maximized, the mathematical expression shows that the coefficient $R_2$ must be such as $R_2 = (n-1)/(n+1)$, n being the sequence number of the echo on the interface $I_3$.

In the case illustrated in FIG. 1, in which the device is used for controlling the cementing of a lining in the shaft or well, the following materials, for example, may be employed:

a. the transducer 22 consisting of a piezo-electric element from barium titanate has an acoustic impedance $Z_{er} = 15.10^6$ kg/m².sec. and emits an acoustic wave having a frequency of 1 MHz. b. the feeler 25 having a thickness d between 2 and 5 mm may consist of a material whose acoustic impedance is between $3.10^6$ and $15.10^6$ kg/m².sec. with an attenuation coefficient $\alpha$ between 0.3 and 3 db/mm, for example, from a material chosen from the following charged araldite, metolux, rilsan, teflon, etc.

For the control of the cementing of a steel lining having a thickness of $d' = 10$ mm and an acoustic impedance of $45.10^6$ kg/m².sec., the feeler 25 is made from charged araldite having an acoustic impedance of $7.10^6$ kg/m².sec., an acoustic attenuation coefficient $\alpha$ of 0.45 db/mm, and a thickness of $d = 5$ mm, which permits reception of the first five echoes of the acoustic wave on the lining-cement interface in the signal furnished by the receiver 22.

When the lining consists of aluminum or a plastic substance, the same materials may be used for the feeler 25.

It is easy to understand from the preceding description that, in the signal furnished by the sonde, one can distinguish all echoes having an amplitude higher than a predetermined threshold, since the impedance of the material being in contact with the lining is low.

The result thereof is that the number of echoes obtained permits a qualitative estimate, giving an indication on the nature of this material in contact with the lining. More particularly, it will be easy to detect the presence of water or gas between the lining and the cement.

Figure 4:
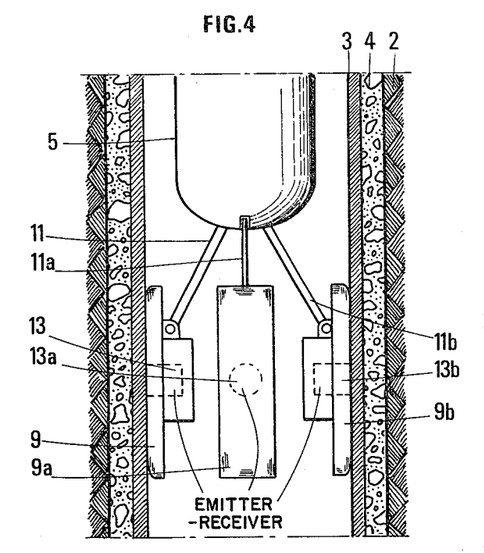
FIG. 4 represents a sonde equipped with several measuring pads.

FIG. 4 represents another embodiment of the measuring sonde used for controlling the cementing of a lining 3 placed inside a well traversing geological formations 4.

Used in this particular embodiment are several measuring pads for example, four pads positioned opposite each other in pairs. Three of these pads 9, 9a, and 9b are visible in FIG. 4. These identical pads are equipped with emitters-receivers 13, 13a, 13b respectively, which control sequentially the cementing the lining 3 on different generator lines.

Figure 5:
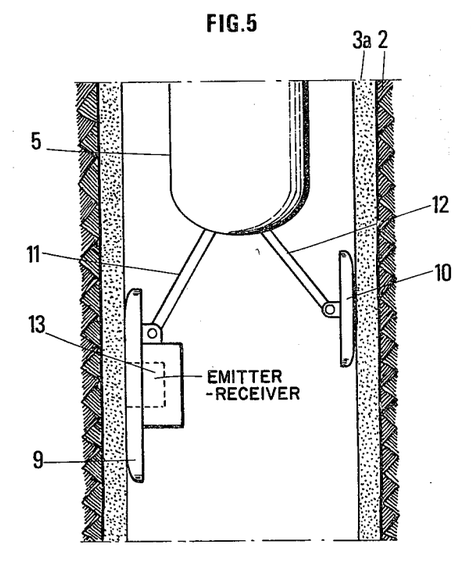
FIG. 5 shows the use of a sonde such as that represented in FIG. 1, designed for measuring the acoustic impedance of geological formations covered by a layer of drilling mud.

FIG. 5 represents the use of a measuring sonde such as that illustrated in FIG. 1 and designed for measuring the impedance of geological formations 2 traversed by a borehole. In this figure, reference numeral 3a designates the deposit of slime, or "mud cake" which is deposited on the wall of the well. In this case, the deposit 3a replaces the lining 3. For purposes of carrying out the measurements under optimal conditions, it suffices to take a sample of this deposit and determine at the surface of the characteristics thereof, such as the acoustic damping coefficient $\beta$, the acoustic impedance $Z_g$, the density $\rho_g$ and the speed of propagation $V_g$ of the acoustic waves.

The material of which the feeler consists, or is made, will be chosen as has been indicated hereinabove.

Normally, the deposit which is formed against the wall of a well has an acoustic impedance between $1.5 \times 10^6$ and $3 \times 10^6$ kg/m².sec. and the feeler will consist of a material having an acoustic impedance between $3.10^6$ and $5.10^6$ kg/m².sec. and an acoustic attenuation coefficient between 0.3 and 3db/mm. Preferably chosen will be a material in the following, non-limitative list: araldite charged with metallic powder, metolux, rilsan, and teflon.

The shape of the feeler will be determined as function of the mechanical characteristics of the deposit of slime or mud-cake in order to obtain a good contact between the feeler and this deposit.

Figure 6:
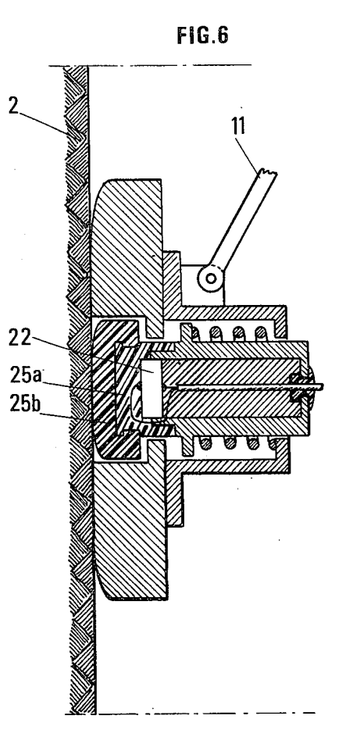
FIG. 6 illustrates a particular embodiment of the measuring pad.

In the case in which the measuring pad is in direct contact with the geological formations whose acoustic impedance is to be measured, a feeler such as the one shown in FIG. 6 may be employed.

The feeler is composed of a first intermediate element 25a in contact with the transducer 22, having a thickness d and an acoustic attenuation coefficient $\alpha$, and a second intermediate element 25b which is in contact with the element 25a and with the geological formations 2, and this element 25b has a thickness $d'$ and an acoustic attenuation coefficient $\beta$. The element 25b replaces the lining 3 of FIG. 1 or the deposit of mud-cakes 3a of FIG. 7. It is understood that the materials of which the elements 25a and 25b consist will be chosen as function of the operating parameters of the apparatus, as has been indicated previously.

The intermediate element which is in contact with the wall of the well may have a deformable surface so as to assure a good contact between this intemediate element and the wall of the well.

Figure 7:
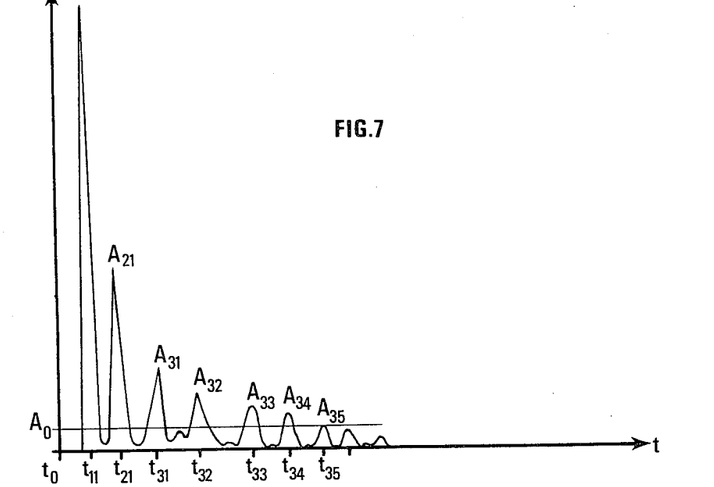
FIG. 7 represents the signal delivered or supplied by the measuring sonde of FIG. 1.

FIG. 7 schematically represents the electric signal furnished or delivered by the piezo-electric element 22 supported by a measuring pad and in which, by virtue of the choice of the materials, the echo amplitudes $A_{11}$, $A_{21}$, $A_{31}$, $A_{32}$, $A_{33}$, and $A_{34}$, for example, have an amplitude of a value higher than a value Ao at least equal to the amplitude of the echo $A_{22}$. This high-frequency signal is applied to the means 17 (FIG. 1) for transmitting to the surface in the cable 18 a signal having a shape or form identical to the signal received, but at a much lower frequency. It is possible to employ a device of the sampling type which furnishes a low-frequency signal, for example 20Hz, that may be transmitted in the commercially available cables without notable attenuation.

The echo amplitude $A_{11}$ is generally of a value much higher than the amplitudes of the other echoes, and it is possible to provide for a peak-limiting device which prevents saturation of the electronic circuits contained in the sonde.

FIGS. 8 through 12 schematically illustrate the surface apparatus for processing the data supplied by the measuring sonde.

Figure 8:
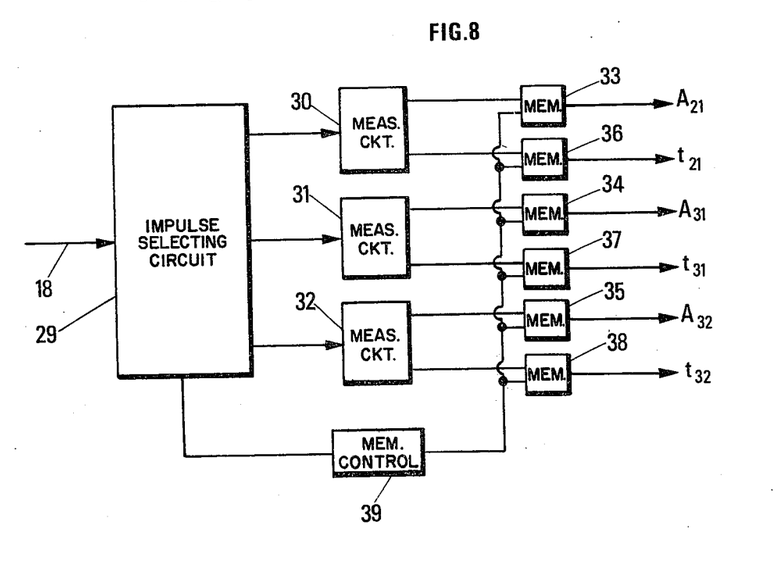
FIGS. 8 through 15 illustrate the surface apparatus and different embodiments thereof as a function of the use of the inventive sonde.

The signal originating from the sonde by means of the cable 18 is applied to an impulse-selecting circuit 29 (FIG. 8)

The latter provides at a first output terminal, the portion of the signal supplied by the sonde and representing the first reflection of the incident impulse on the interface previously designated as $I_2$, i.e. the impulse $A_{21}$, which is, thereafter, transmitted to a measuring circuit 30. In the same fashion, the impulse selector 29 provides at least two other output terminal portions of the signal delivered by the sonde and representing at least two successive reflections of the incident impulse at the interface designated with $I_3$, for example, the impulses $A_{31}$ and $A_{32}$ transmitted, respectively, to measuring circuits 31 and 32. Each of the measuring circuits 30, 31, and 32 generates, at a first output terminal, a signal as a function of a magnitude characteristic of the impulse which has been applied thereto, such as its amplitude, its surface area, or the square root of the latter. This signal is transmitted to a first memory device (memories 33, 34, and 35, respectively), where it is recorded.

At a second output terminal, each measuring circuit produces a signal representing the instant of the arrival ($t_{31}$ and $t_{32}$) at the piezo-electric element 22 of the impulse which it receives, and this signal is recorded in a second memory device (memories 36, 37 and 38, respectively).

The memory devices 33 to 38 are regularly controlled and deliver or furnish their data due to the action of a device 39, which then is reset to zero and which is synchronized with the impulse selector device 29.

In the following description, it will be assumed, by way of example, that the signals transmitted to the memories 33 to 35 represent the amplitudes of the impulses received by the measuring circuits 30, 31 and 32.

The information contained in the memory 33 is applied to a divider circuit 40 (FIG. 10) which simultaneously receives a predetermined signal representative of the value $A_M(1-R_1)^2$, $A_M$ being the amplitude of the acoustic impulse emitted by the piezo-electric element 22 (FIG. 3) and $R_1$ the value of the reflection coefficient of the interface $I_1$. The divider circuit 40 furnishes a signal representative of the value $A_{21}/[A_M(1-R_1)^2]$ which is transmitted to the multiplying circuit 41.

Figure 10:
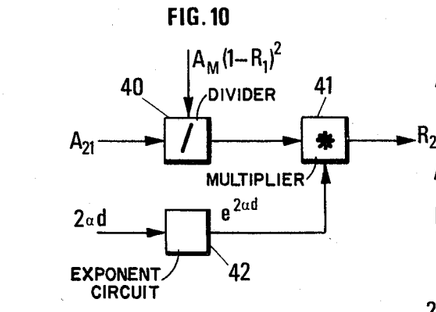
Figure 11:
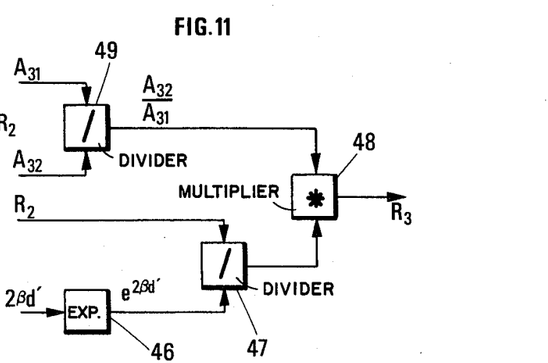

A signal determined as function of the value $2\alpha d$ ($\alpha$ being the acoustic attenuation coefficient of the sensor 25 and $d$ its thickness) is applied to a circuit 42 which produces a signal having the value $\exp.(2\alpha d)$ and the latter is transmitted to a circuit 41 which furnishes a signal representative of $A_{21}/[A_M(1-R_1)^2] \exp.(2\alpha d)$, in other words, representative of the value of $R_2$ which is the reflection coefficient of the interface $I_2$.

The data contained in the memories 37 and 38 are transferred to a circuit 43 (FIG. 9) which provides a signal representing the time interval $\Delta t$ separating the arrival instants $t_{31}$ and $t_{32}$ of the impulses $A_{31}$ and $A_{32}$ at the piezo-electric element 22. This signal is received by a multiplying circuit 44 which also receives a signal predetermined according to the value of the acoustic speed of propagation V in the material in contact with the formations whose acoustic impedance is desired to be measured. The signal generated by the circuit 44 represents twice the distance $d'$ separating the interfaces $I_2$ and $I_3$. This signal is applied to the multiplying circuit 45 which simultaneously receives a signal that is predetermined as a function of the value of the acoustic attenuation coefficient $\beta$ and furnishes a signal representing the value $2\beta d'$.

The signal $2\beta d'$ is transmitted to the circuit 46 (FIG. 11) which furnishes a signal representative of the value $\exp(2\beta d')$ and is applied to a divider circuit 47. The latter also receives the signal of the circuit 41 (FIG. 10) and produces a signal representative of the value $1/R_2 \exp(2\beta d')$ applied to a multiplier circuit 48.

The data contained in the memories 34 and 35 (FIG. 8) are transmitted to a divider circuit 49 (FIG. 11) whose output signal $A_{32}/A_{31}$ is applied to a multiplier circuit 48 which produces an output signal representative of $R_3 = A_{32}/(A_{31}R_2) \exp.(2\beta d')$.

The latter signal is transmitted simultaneously (FIG. 12) to an adding circuit 50 and to a sign-inverting circuit or gate 51. The circuit 50 furnishes a signal ($1+R_3$) transmitted to the divider circuit 52. The circuit 51 delivers a signal ($-R_3$) applied to an input of the adding circuit 53 which furnishes a signal having the value ($1-R_3$) transmitted to the circuit 52. The latter produces a signal representative of the relative index m of the materials situated on both sides of the interface $I_3$, equal to $1+R_3/1-R_3 = m$. The signal of the circuit 52 is transmitted to one input of divider circuit 54 which receives on another input a signal preregulated according to the value of the acoustic impedance of the material in contact with the formation the acoustic impedance of which is to be measured.

Figure 12:
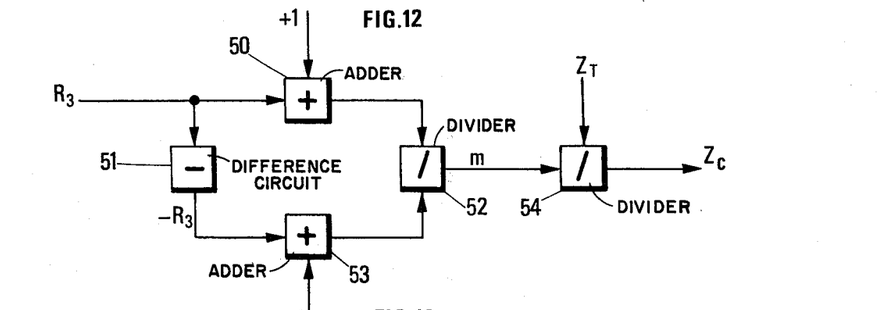

The circuit 54 delivers a signal $Z_c$ equal to the value of the impedance of the geological formation.

This signal is recorded and/or indicated on an apparatus (not shown) which generates a curve representing the value of the impedance measured as function of the depth of the measuring sonde in the well.

This signal $Z_c$ may be utilized to produce a signal representative of the porosity $\phi$ of the formation.

In fact, the following ratio $$Z_c = V_c \times \rho_c$$

is obtained if $\rho_c$ is the global volumetric mass of the formation, and $V_c$ the speed of sound in this formation, or $$Z_c = \frac{\rho_c}{\Delta t_c}$$

if $\Delta t_c$ is the time taken by the sound to travel through the unit of length in the formation. One thus deduces therefrom the following relationship:

$$Z_c = \frac{\rho f \times \phi + (1-\phi)\rho_{ma}}{\Delta t_f \times \phi + (1-\phi)\Delta t_{ma}}$$

wherein:

$\rho_f$ is the density of the interstitial fluid in the formation, $\rho_{ma}$ is the density of the matrix of this formation (or density of the rock), $\Delta t_f$ is the time taken by the sound to travel through the unit of length in the interstitial fluid, and $\Delta_{ma}$ is the time taken by the sound to travel through a unit of length in the matrix.

From the above formula there is obtained the relationship:

$$\phi = \frac{\rho_{ma} - Z_c \Delta t_{ma}}{Z_c (\Delta t_f - \Delta t_{ma}) - (\rho_f - \rho_{ma})}$$

In this formula, the values of $\rho_f$, $\rho_{ma}$, $\Delta t_f$, $\Delta t_{ma}$ are constants known for each of the formations studied.

Figure 16:
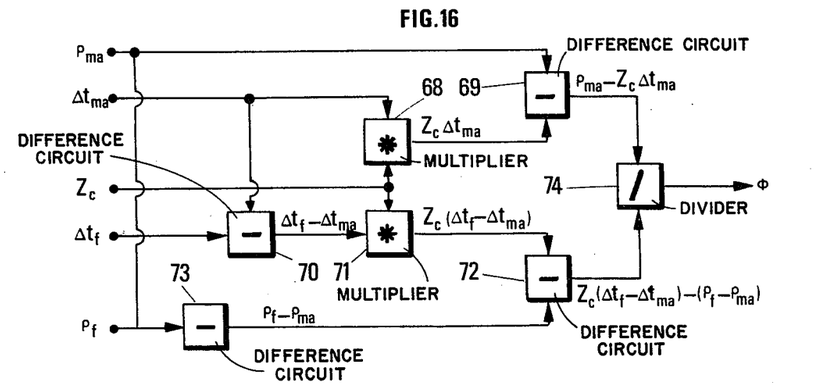
FIG. 16 illustrates a group of circuits for evaluating the porosity of a geological formation from the previously determined value of the acoustic impedance thereof.

FIG. 16 illustrates a group of circuits which makes it possible to determine the value of the porosity of a geological formation from the previously determined value of the acoustic impedance $Z_c$ thereof.

The signal $Z_c$ delivered by the circuit 54 of FIG. 12 is applied to a multiplier circuit 68 which also receives a signal representative of the value of the time interval $\Delta t_{ma}$ defined hereinabove.

The signal representative of the value of the product $Z_c \Delta t_{ma}$ provided by the circuit 68 is applied to a subtracting circuit 69, which also receives a signal representative of the value of the volumetric mass $\rho_{ma}$ defined hereinabove. The circuit 69 furnishes a signal representative of the value of the difference:

$$\rho_{ma} - Z_c \Delta t_{ma}$$

Signals representative of the values of $\Delta t_{ma}$ and $\Delta t_f$, respectively, are applied to a subtracting circuit 70 which supplies a signal representative of their difference, this signal being applied to a multiplier circuit 71 which also receives a signal representative of the value of $Z_c$ emanating from the circuit 54 of FIG. 12.

The multiplier circuit 71 delivers a signal representative of the value of the product $Z_c(\Delta t_f - \Delta t_{ma})$ which is applied to the subtraction circuit 72 which also receives a signal representative of the value of the difference $\rho_f - \rho_{ma}$ supplied by the subtraction circuit 73.

Under these conditions, the circuit 72 supplies a signal representative of the difference $Z_c (\Delta t_f - \Delta t_{ma}) - (\rho_f - \rho_{ma})$.

The signals emanating from the circuits 69 and 72 are applied to the divider circuit 74 which supplies a signal representative of the quotient:

$$\frac{\rho_{ma} - Z_c \Delta t_{ma}}{Z_c (\Delta t_f - \Delta t_{ma}) - (\rho_f - \rho_{ma})},$$

i.e. a signal representative of the porosity $\phi$ of the formation.

The apparatus for processing the data as described hereinabove is usual with a sonde equipped with a measuring pad such as that shown in FIG. 2 and employed for controlling the cementing of a lining in a well. In this case, the signals V, $\beta$ and Z applied respectively to the circuits 44, 45 (FIG. 9) and 54 (FIG. 12) represent respectively the speed of acoustic propagation in the lining, the acoustic attenuation coefficient, and the acoustic impedance of the material constituting the lining.

Figure 9:
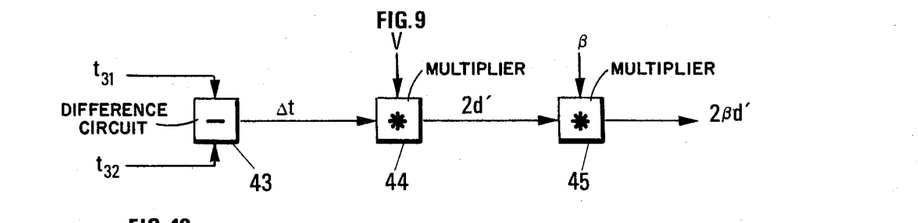

In the case where the same measuring pad is utilized for measuring the acoustic impedance of the geological formations traversed by a well whose wall is covered with a deposit of slime or mud-cake, the signals V, $\beta$ and Z represent the same acoustic characteristics measured for a sample of the deposit taken from the well.

When a measuring pad is used such as the one shown in FIG. 6, for the purpose of measuring the acoustic impedance of geological formations directly in contact with the measuring pad, the signals V, $\beta$ and Z represent the acoustic characteristics of the intermediate element 25b, the signal $\alpha$ representing the acoustic attenuation coefficient of the intermediate element 25a, and $d$ the thickness of this intermediate element.

Modifications may be applied to the surface apparatus. For example, the selector 29 (FIG. 8) maay have as many output terminals as the number of impulses measured originating from the reflections of the incident impulse on the interface I$_3$, provided it is possible to measure at least the characteristcs of two successive impulses $A_{3n}$ and $A_{3(n+1)}$.

According to use of the device proposed by the present invention, the apparatus for processing the data may be simplified. For example, in order to control or check a good cementing of a lining within a well by measuring the acoustic impedance of the material in contact with the lining, one may directly indicate the value $2\beta d'$ on the circuit 46 (FIG. 11), $d'$ being the thickness of the lining and $\beta$ the acoustic attenuation of the material constituting this lining with $\beta$ and $d'$ then being determined at the time of the manufacture of the lining or by a measurement on a sample thereof.

The memories 36, 37, 38 (FIG. 8) and the circuits 43, 44 and 45 (FIG. 9) may be deleted in this case.

When the measuring pad shown in FIG. 6 is used, the circuits 40 to 42 may also be eliminated, since the value of R$_2$ (the reflection coefficient between the two intermediate elements 25a and 25b) is determined at the time of the construction of the measuring pad. The selector 29 (FIG. 8) may, in this case, have only two output terminals in order to measure, with the aid of the devices 31 and 32, solely the amplitude of two consecutive impulses originating from the reflection of the incident impulse on the interface I$_3$.

Figure 13:
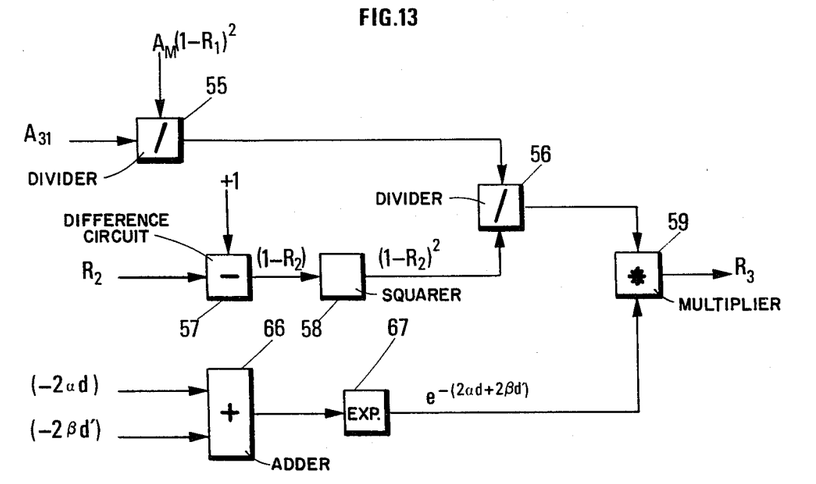

With the values of R$_2$, $2\alpha d$, and $2\beta d'$ having been determined by means of the circuits represented in FIGS. 9 and 10, or measured previously, it is possible to make use of a simplified apparatus such as the one illustrated in FIG. 13.

The value of the amplitude of the first echo from the reflection of the incident wave at the interface I$_3$ is applied to a divider circuit 55 which receives simultaneously a signal representative of the value $A_M (1-R_1)^2$. This circuit supplies a signal proportional to $A_{31}/[A_M (1-R_1)^2]$ which is transmitted to a divider circuit 56. A signal having the value R$_2$ is indicated on the circuit 57 which generates a signal representing the value $(1-R_2)$ transmitted to a circuit 58 for raising it to the second power. The signal obtained is communicated to the divider circuit 56 whose output signal represents the value $A_{31}/[A_M (1-R_1)^2 (1-R_2)^2]$.

The values $(-2\alpha d)$ and $(-2\beta d')$ are added in the circuit 66 and the result is transmitted to the circuit 67 which supplies a signal proportional to exp. $(-2\alpha d - 2\beta d')$. This signal is applied to the divider circuit 59 which also receives the output signal of the circuit 56 and supplies a signal representative of the value of R$_3$ which is processed in a circuit identical to that of FIG. 12.

It would equally be possible to use a measuring block such as the one described in connection with FIG. 2 to measure the acoustic impedance of geological formations on which the measuring block or support is directly supported. In this case, one will select the material constituting the feeler in such a manner that it is possible to observe successive reflections of the incident impulse on the interface of feeler 25 — geological formations.

A circuit 60 (FIG. 14) produces the ratio of the amplitudes of two successive echoes. The result is divided by the value R$_1$ in a divider circuit 61, then multiplied in a circuit 62 by a factor exp $(2\alpha d)$ supplied by a circuit 63, at the input of which there is applied a signal representing the value $2\alpha d$.

Figure 14:
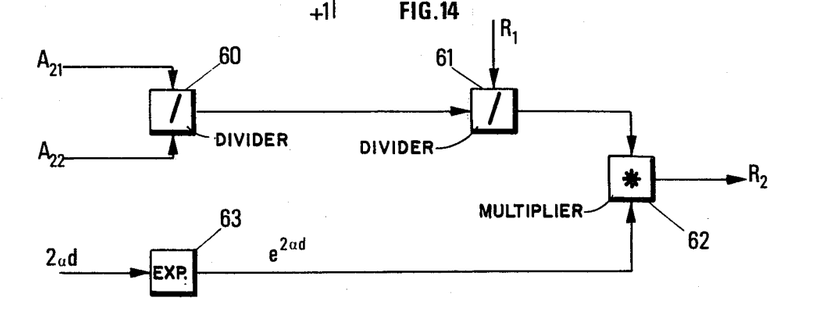

The signal supplied by the circuit 62 is representative of the value of the reflection coefficient R$_2$ which, evaluated in a circuit similar to that described and disclosed in FIG. 12, allows for determining the value of the acoustic impedance of the geological formations in contact with the feeler 25.

Figure 15:
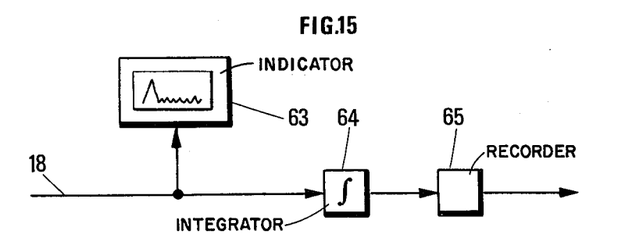

Shown in FIG. 15 is a simplified apparatus which allows for controlling or checking the cementing of a lining within a well.

The signal originating from the measuring sonde, which may be made indicated on a device 63, is integrated in a circuit 64 and is then recorded in a circuit 65 as function of the depth of the measuring sonde within the well. Obtained thereby is a curve which makes it possible to control or check the quality of the cementing of the lining within the well.

The circuits of FIGS. 8 through 14 need not be modified in one used, instead of the amplitudes of the impulses received by the circuits 30 to 32, the square roots of the surface areas of these impulses. In case it is desired to proceed with determining the acoustic impedance $Z_c$ and possibly the porosity $\phi$ on the basis of the surface areas themselves of these impulses, it would be expedient to apply to these circuit modifications which are within the knowledge of those skilled in the art.

We claim:

1. A method for the precise localized determination of the acoustic impedance of materials situated in proximity to the wall of a drilled well, into which there is introduced a measuring sonde connected by means of electrical conductors to a surface apparatus for processing the data supplied by said sonde, comprising the successive steps of:
   a. emitting an acoustic impulse in a direction substantially perpendicular to the wall of the well traversing the mterials the acoustic impedance of which is to be determined, and through at least two intermediate elements having accurately known acoustic characteristics, a first of said intermediate elements being in contact with said materials;
   b. receiving at least one acoustic impulse being reflected substantially perpendicularly to the contact surface of said first intermediate element and said materials;
   c. generating in response to said reflected impulse, an electric signal representative of said acoustic impulse;
   d. transmitting said electric signal to said means for processing the data supplied by said sonde; and
   e. generating, in response to said electric signal, a resultant signal being representative of the acoustic impedance of said materials.

2. A method according to claim 1, further comprising the step of determining the porosity of a formation by generating, in response to said resultant signal representative of the acoustic impedance of said formation, a signal representative of the porosity of said formation, said signal being proportional to the function $$\phi = \frac{\rho_{ma} - Z_c \Delta t_{ma}}{Z_c (\Delta t_f - \Delta t_{ma}) - (\rho_f - \rho_{ma})}$$

wherein $Z_c$ is representative of said resultant signal, $\rho_{ma}$ and $\rho_f$ are, respectively, the values of the volumetric mass of the matrix of said formation, and of the volumetric mass of the interstitial fluid of said formation, $\Delta t_{ma}$ and $\Delta t_f$ are the times required by the sound to travel through the unit of length in the matrix and the interstitial fluid, respectively.

3. A device for the precise localized determination of the acoustic impedance of materials situated in proximity to the wall of a drilled well into which there is introduced a measuring sonde, said device comprising a first intermediate element placed in contact with the materials on a portion of the wall of the well, the specific acoustic characteristics of said first intermediate element being accurately known, said sonde comprising:
   first means for emitting an incident acoustic impulse in a direction substantially perpendicular to the axis of the well;
   at least a second intermediate element the specific acoustic characteristics of which being accurately known, said second intermediate element being in contact with said first element, the contact surface of said first intermediate element with said second intermediate element and with the wall of the well respectively being placed on the path of said incident acoustic impulse;
   second means for receiving at least one reflected acoustic impulse originating from at least one point of reflection of the incident acoustic impulse on said contact surface of said first intermediate element and the wall of the well in said direction substantially perpendicular to the axis of the well, said receiving means supplying an electric signal representative of said reflected impulse upon receiving the latter;
   control means connected to said first means for periodically enabling the emission of an incident acoustic impulse by said first means; and
   transmitting means, connected to said receiving means,
   said device further comprising a surface apparatus for processing said electric signal supplied by said receiving means, said surface apparatus being connected to said transmitting means.

4. A device according to claim 3, wherein said surface apparatus comprises:
   means for producing a resultant electric signal representative of the acoustic impedance of a geological formation traversed by a borehole, said means being connected with means for producing a signal representative of the porosity $\phi$ of the formation, wherein $$\phi = \frac{\rho_{ma} - Z_c \Delta t_{ma}}{Z_c (\Delta t_f - \Delta t_{ma}) - (\rho_f - \rho_{ma})}$$

wherein $Z_c$ is representative of said resultant signal, $\rho_{ma}$ and $\rho_f$ are, respectively, the values of the volumetric mass of the matrix of said formation and of the volumetric mass of the interstitial fluid of said formation, $\Delta t_{ma}$ and $\Delta t_f$ are the times required by the sound to travel through the unit of length in the matrix and the interstitial fluid respectively.

5. A device according to claim 3, wherein said first means and said second means consist of a single transducer of the piezo-electric type for supplying an incident acoustic impulse upon receiving an electric signal supplied by said control means and for supplying an electric signal representative of said reflected acoustic impulse reflected when receiving the latter.

6. A device according to claim 5, wherein said transducer is adapted to supply an acoustic impulse having a frequency between 0.1 MHz and 5MHz.

7. A device according to claim 6, wherein said transducer is composed of a piezoelectric element made of barium titanate.

8. A device according to claim 7, wherein said second intermediate element consists of a material having an acoustic attenuation coefficient with a value between 0.3 and 3 decibels per millimeter and an acoustic impedance of a value comprised between 3 and 15 kilograms per square meter per second.

9. A device according to claim 6, wherein said transducer is composed of a piezo-electric element made of lead zirconate.

10. A device according to claim 5, wherein said transducer is adapted to supply an acoustic impulse having a frequency approximately equal to 1 MHz.

11. A device according to claim 10, wherein said second intermediate element has a contact surface with said transducer placed in the path of said incident acoustic impulse, and wherein the acoustic impedances of the materials constituting said transducer and said first and second intermediate elements have values such that the acoustic reflection coefficient of the contact surface of said second intermediate element and of said transducer has a value approximately equal to zero and that the acoustic reflection coefficient of the contact surface of said first and second intermediate elements has a value between 0 and 1, and in that the product of the attenuation coefficient, measured in decibels per millimeter of the second intermediate element, by the distance separating the contact surfaces of said second intermediate element with, respectively and piezoelectric element and said first intermediate element, is sufficient to cause a rapid decrease of the amplitudes of the reflected acoustic impulses originating from the successive reflection of the acoustic impulses on the contact surface of said intermediate elements, in such a manner that the acoustic impulses intercepted or collected by said piezo-electric element originate essentially from the reflections of the acoustic impulses on the contact surface of said first element and of said material traversed by the borehole.

12. A device according to claim 11, wherein said acoustic reflection coefficient of the contact surface of said first and second intermediate elements has a value approximately equal to 0.5.

13. A device according to claim 12, wherein the apparatus for processing the data supplied by the sonde comprises a recording circuit for indicating the signal supplied by the sonde; an circuit for integrating the signal supplied by the sonde, and a recording circuit connected to said integrating circuit and recording the signal supplied by said integrating circuit as a function of the depth of the sonde within the well.

14. A device according to claim 11, for controlling cementing of a lining placed inside a well, wherein said first intermediate element consists of said lining.

15. A device according to claim 11, for the determination of the acoustic impedance of geological formation traversed by a well the wall of which is covered with a mud-cake, wherein said first intermediate element consists of said mud cake.

16. A device according to claim 11, wherein said apparatus for processing the data being supplied by the measuring sonde comprises:
an impulse selector circuit for supplying on a first output terminal thereof the portion of the signal furnished by the measuring sonde, representative of the first reflection of the incident acoustic impulse on the contact surface between said intermediate elements and, on at least a second and third output terminal thereof, the portions of the signal being respectively representative of two successive reflections of the incident acoustic impulse on the contact surface between said first intermediate element and the material for which the acoustic impedance is intended to be determined;
measuring circuits each connected to one output terminal of said selector circuit, said measuring circuits each furnishing at least one signal being representative of the portion of the signal which appears on the corresponding output terminal of said selector circuit;
a first circuit, connected to said selector circuit, for supplying a resultant signal from a signal proportional to the attenuation coefficient of the acoustic impulses in said first intermediate element, a signal proportional to the acoustic reflection coefficient of the contact surface between said intermediate elements and signals furnished by said measuring circuits connected to said second and third output terminals of said impulse selector circuit;
said resultant signal being proportional to the value of the reflection coefficient of the contact surface between said first intermediate element and said material, and
a second circuit, connected to said first circuit, for producing from a signal proportional to the acoustic impedance of said first intermediate element and the signal delivered by said first circuit, a resultant signal representative of the acoustic impedance of said material.

17. A device according to claim 16, wherein each of said measuring circuits provides a second signal representative of the instant of arrival at said transducer of the reflected acoustic impulse corresponding to the portion of the signal received by the measuring circuit, and in that it comprises:
a third circuit, connected to said measuring circuits, and adapted to produce, from said second signals corresponding to the portions of the signal appearing on said second and third output terminals of said selector circuit, a signal proportional to the attenuation coefficient of the acoustic waves in said first intermediate element, and
a fourth circuit, connected to said measuring circuit, corresponding to said first output terminal of said selector circuit, adapted to produce a signal proportional to the value of the acoustic reflection coefficient of the contact surface of said intermediate elements, the output terminals of said third and fourth circuits being connected to the input terminals of said first circuit.

18. A device according to claim 17, wherein said third circuit is composed of a first circuit element receiving said second signals provided by the measuring circuits corresponding to said second and third output terminals of said selector circuit and supplying a signal proportional to the difference of the signals which are applied thereto, a second circuit element connected to said first circuit element and supplying a signal proportional to the product of the value of said signal which is applied thereto by the value of the speed of acoustic propagation in said first intermediate element and a third circuit element receiving the signal supplied by said second circuit element and furnishing a signal, representative of the product of the signal received by a predetermined value proportional to the damping coefficient of the acoustic impulse in said first intermediate element.

19. A device according to claim 17, wherein said fourth circuit consists of a first circuit element supplying a signal proportional to the reverse of the attenuation of a reflected acoustic impulse a second circuit element connected to said measuring circuit corresponding to the first output terminal of said selector circuit and dividing said first signal of said measuring circuit by a coefficient representative of the amplitude of the incident impulse emitted by said transducer multiplied by the square of the value of the acoustic transmission coefficient of the contact surface of the transducer and of said second intermediate element, and a third circuit element connected to said first and third circuit elements and supplying a signal representative of the product of the signals which are transmitted thereto.

20. A device according to claim 13, wherein said first circuit consists of a first circuit element at the input terminal of which there is applied a signal representative of the acoustic attenuation coefficient of said first intermediate element and which generates a signal proportional to the reverse of the acoustic damping of a reflected impulse in said first intermediate element, a second circuit element receiving on a first input terminal thereof the signal furnished by said first circuit element and on a second input terminal a signal proportional to the value of the acoustic reflection coefficient of the contact surface between said intermediate elements, said second circuit element furnishing a signal proportional to the ratio of the signal applied on its first input terminal and of that applied on its second input terminal and, a third circuit element connected to said measuring circuits of said selector circuit and receiving, on two input terminals, the first signals supplied by said measuring circuits corresponding to said second and third output terminals of said impulse selector circuit, said third circuit element supplying a signal proportional to the ratio of the first signal furnished by said measuring circuit corresponding to the third output terminal of said selector circuit and that furnished by said measuring circuit corresponding to the second output terminal of said selector circuit, and a fourth circuit element connected to said second and third circuit elements and furnishing a signal proportional to the product of the signals supplied by said second and third circuit elements.

21. A device according to claim 13, wherein said second circuit consists of a first and a second circuit element connected to said first circuit, the first circuit element supplying a signal whose value is equal to that of the signal supplied by said first circuit increased by one unit, said second circuit element supplying a signal whose value is equal to that of the signal supplied by said first circuit with a change in the sign thereof, a third circuit element connected to said second circuit element and supplying a signal whose value is equal to that of the signal supplied by said second circuit element reduced by one unit, a fourth circut element connected to said first and third circuit elements and supplying a signal proportional to the ratio of the signals supplied by said first and third elements, a fifth circuit element receiving on a first input terminal the signal issued from said fourth circuit element, and on a second input terminal a signal proportional to the acoustic impedance of said first intermediate element, said fifth circuit element producing a signal proportional to the ratio of the signals which are applied on its second and its first input terminal and which is representative of the acoustic impedance of said material traversed by the borehole.

22. A device according to claim 11, for the determination of the acoustic impedance of geological formations traversed by a well, wherein said first intermediate element is integral with said sonde and has a contact surface with said intermediate element.

23. A device according to claim 5, wherein said measuring sonde comprises at least one measuring pad displaceable with respect to the body of the sonde so as to be applied against the wall of the well, said pad having a housing for at least said second transducer and said intermediate element integral with respect to each other, and elastic means interposed between said pad and said transducer.

24. A device according to claim 3, wherein said first intermediate element has a deformable surface in contact with the wall of the well.

* * * * *